United States Patent
Bournas

(10) Patent No.: US 6,769,030 B1
(45) Date of Patent: Jul. 27, 2004

(54) METHOD AND APPARATUS TO EVALUATE AND MEASURE THE OPTIMAL NETWORK PACKET SIZE FOR FILE TRANSFER IN HIGH-SPEED NETWORKS

(75) Inventor: Redha M. Bournas, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/499,416

(22) Filed: Feb. 7, 2000

(51) Int. Cl.[7] .......................... G06F 15/16; G06F 11/00
(52) U.S. Cl. ........................ 709/233; 709/232; 370/231
(58) Field of Search .............................. 709/232, 236, 709/238, 241, 233; 370/229, 231, 232, 252; 710/60

(56) References Cited

U.S. PATENT DOCUMENTS

| | | | | |
|---|---|---|---|---|
| 5,442,637 A | * | 8/1995 | Nguyen ....................... | 714/708 |
| 5,459,720 A | * | 10/1995 | Iliev et al. ................... | 370/393 |
| 5,477,531 A | * | 12/1995 | McKee et al. ............... | 370/249 |
| 5,530,695 A | * | 6/1996 | Dighe et al. ................. | 370/232 |
| 5,764,625 A | * | 6/1998 | Bournas ....................... | 370/231 |
| 5,982,778 A | * | 11/1999 | Mangin et al. .............. | 370/445 |
| 5,995,488 A | * | 11/1999 | Kalkunte et al. ............ | 370/232 |
| 6,076,114 A | * | 6/2000 | Wesley ........................ | 709/235 |
| 6,105,064 A | * | 8/2000 | Davis et al. ................. | 709/224 |
| 6,201,791 B1 | * | 3/2001 | Bournas ....................... | 370/234 |
| 6,205,120 B1 | * | 3/2001 | Packer et al. ................ | 370/235 |
| 6,212,190 B1 | * | 4/2001 | Mulligan ...................... | 370/400 |
| 6,370,114 B1 | * | 4/2002 | Gullicksen et al. .......... | 370/229 |
| 6,480,899 B1 | * | 11/2002 | Seddigh et al. .............. | 709/240 |
| 6,487,393 B1 | * | 11/2002 | Davenport et al. ......... | 455/67.7 |

FOREIGN PATENT DOCUMENTS

| | | | | |
|---|---|---|---|---|
| EP | | 836300 A2 | * 4/1998 | ........... H04L/12/56 |

OTHER PUBLICATIONS

Mogul, J. et al., "Path MTU Discovery", RFC 1191, pp. 1–19, Nov. 1990.*
Bournas, R.M., "Optimization of TCP segment size for file transfer", researchweb.watson.ibm.com/journal/rd/413/bournas.txt, IBM, pp. 1–12, 1997.*
Glossbrenner, Kenneth C., "Probing IP Throughput", IETF IPPM Mail Archive Contents, www.advanced.org/IPPM/archive.1/0400.html, Mar. 1998.*
Vanous, George, "Optimizing Internet Throughput", www-.realitydesigns/george/optimizinginternetthroughput/index.html, pp. 1–10, 2000.*
Derfler, Jr., Frank J. et al., "How Networks Work: Bestsellers Edition", Ziff–Davis Press, pp. 159–160, 1996.*

(List continued on next page.)

*Primary Examiner*—Jason D. Cardone
(74) *Attorney, Agent, or Firm*—Duke W. Yee; Gregory M. Doudnikoff; Stephen R. Tkacs

(57) ABSTRACT

A method and apparatus for maximizing a transfer of data to a target. A set of packets using the first packet size and the second packet size is sent to the target to form a set of transferred packets. Round trip times and service times are identified for the set of transferred packets. Optimal packet size is selected using the round trip times and service times for the set of packets, wherein the optimal packet size is used in transferring the data to the target.

49 Claims, 4 Drawing Sheets

OTHER PUBLICATIONS

Bournas, R.M. et al., "Time–average and asymptotically optimal flow control policies in networks with multiple transmitters", NEC Researchindex, citeseer.nj.nec.com/298977.html, pp. 1–28, Sep. 1991.*

Britton, E.G. et al., "TCP/IP: The next generation", IBM Systems Journal, vol. 34, No. 3, 1995.*

Bournas, R.M., "Optimization of TCP segment size for file transfer", IMB Journal of Research and Development, vol. 41, No. 3, 1997.*

"Effects of TCP and IP Tuning Parameters on Network Throughput", Redha M. Bournas, Jan., 1994, Document No. TR 29.1830.

"Bounds for Optimal Flow Control Window Size Design with Application to High Speed Networks", by Redha M. Bournas, Document No. TR 29.1885.

"Evaluation of File Transfer Throughtput in the Presence of Transmission or Network Congestion Errors", By Redha M. Bournas, Aug., 1999.

* cited by examiner

METHOD AND APPARATUS TO EVALUATE AND MEASURE THE OPTIMAL NETWORK PACKET SIZE FOR FILE TRANSFER IN HIGH-SPEED NETWORKS

BACKGROUND OF THE INVENTION

1. Technical Field

The present invention relates generally to an improved distributed data processing system and in particular to a method and apparatus for transferring data across a distributed data processing system. Still more particularly, the present invention provides a method and apparatus for selecting a packet size for transferring data from a source to a target in a distributed data processing system.

2. Description of Related Art

In transferring data between a source and a target in a distributed data processing system, one problem addressed is how to send data from the source to the target in a manner that optimizes network productivity. Another problem addressed in sending data is determining the right amount of data that should be sent at a time. The amount of data sent at a time is also referred to as the window size. The optimal size for the data window varies based on the number of intermediate nodes in the transmission network, the transmission medium, the processing power of each intermediate node, the type of data being sent, and many other factors. The desire to arrive at the optimal window size is motivated by the need to maximize network productivity. If the optimal window size can be derived, then the network can perform at maximum efficiency.

This selection of a window size is a key parameter governing file transfer throughput rates between a source and a target in a distributed data processing system. This solution focuses on an optimal window size. It is desirable to maximize optimal throughput in which an alternative parameter other than window size may be used when other parameters may be varied.

Therefore, it would be advantageous to have an alternative mechanism to maximize the throughput in transferring files across a distributed data processing system.

SUMMARY OF THE INVENTION

The present invention provides a method and apparatus for maximizing a transfer of data to a target. A set of packets using the first packet size and the second packet size is sent to the target to form a set of transferred packets. Round trip times and service times are identified for the set of transferred packets. Optimal packet size is selected using the round trip times and service times for the set of packets, wherein the optimal packet size is used in transferring the data to the target.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
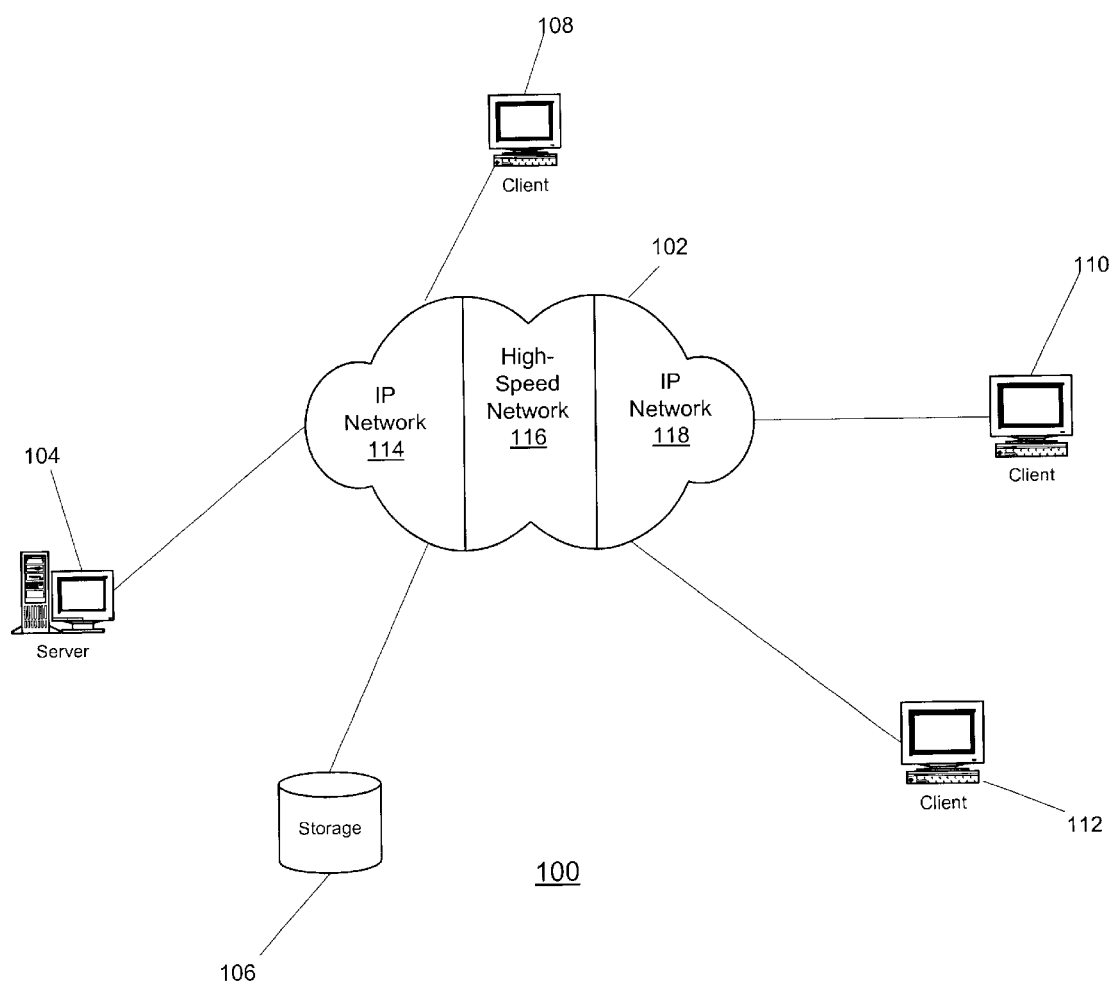
FIG. 1 is a pictorial representation of a distributed data processing system in which the present invention may be implemented.

With reference now to the figures, FIG. 1 is a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown.

In the depicted example, network 102 actually includes different types of networks. An IP network 114, a high-speed network 116, and an IP network 118 make up network 102 in this example. In this example, high-speed network 116 may be an asynchronous transfer mode (ATM) network. High-speed network 116 may provide a connection for transferring data between different portions of IP network 114 and IP network 118, which may be the Internet in these examples. Of course IP network 114 and IP network 118 also may be implemented as a number of different types of networks, such as for example, an intranet, a local area network (LAN), or a wide area network (WAN). High-speed network 118 may be implemented using other high-speed networks other than ATM networks, such as, for example, synchronous optical network (SONET). FIG. 1 is intended as an example, and not as an architectural limitation for the present invention.

In high-speed network 116, the transmission of data is broken into cells of equal size. The present invention recognizes that in this situation, the IP packet size is not limited to a maximum size. This flexibility in choosing the network packet size allows for much higher file transfer rates to be achieved when an optimal packet size is selected.

The sending and receiving stations, such as server 104 and client 110, are both connected to IP network 114 and IP network 118, which are interconnected through high-speed network 116. Data is transmitted from the sending station, server 104, using the IP protocol. When it is determined that the network medium is high-speed, the packets are fragmented into small cells of equal size before being transmitted across high-speed network 116. At the other end of high-speed network 116, when it is determined that the network medium is an IP network, IP network 118, the cells are reassembled back into IP packets before transmission to the receiving station, client 110.

The present invention provides a method, apparatus, and computer implemented instructions for identifying the size of the IP network packets that maximizes the file transfer throughput rate sustained between the sending and receiving stations. In these examples, it is assumed that the transport protocol is the Transmission Control Protocol (TCP) or any other protocol that uses the sliding window protocol for flow control. The protocol for the high-speed network is ATM or any other protocol that does not limit packet size to a maximum size for IP packets being transferred over the high-speed network.

Figure 2:
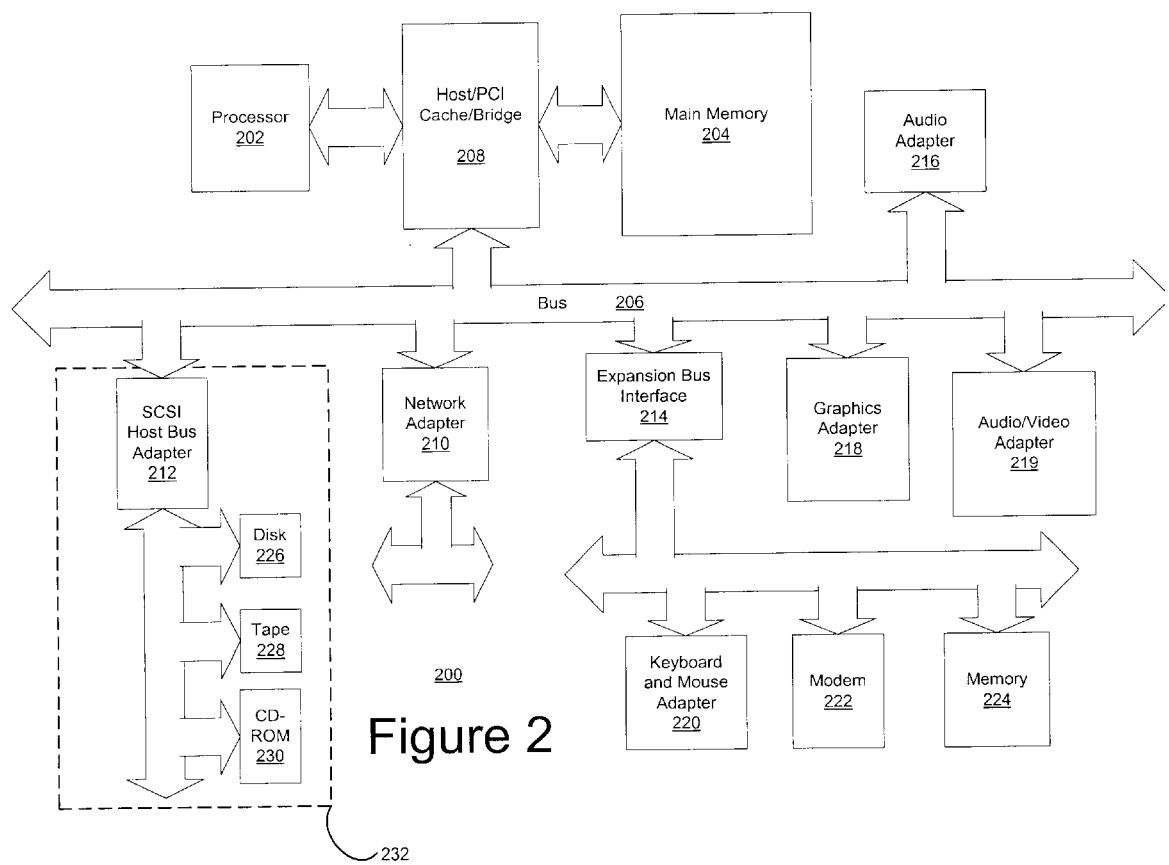
FIG. 2 is a block diagram illustrating a data processing system in which the present invention may be implemented.

With reference now to FIG. 2, a block diagram illustrating a data processing system in which the present invention may be implemented. Data processing system 200 is an example of a computer, such as computer 108 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, network adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows NT™, which is available from Microsoft Corporation.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

Instructions for the operating system and applications or programs are located on storage devices, such as hard disk drive 226, and may be loaded into main memory 204 for execution by processor 202. In particular, these instructions include those needed to select and measure parameters used to identify an optimal packet size for transferring packets across a network. The mechanism implemented by these instructions is used to identify an average round trip time and an average acknowledgment time interval, which are used to calculate the optimal network packet size. The average round trip time of a packet is the average elapsed time from the time a packet is transmitted from a sending station until the time an acknowledgment is received at the sending station. The average inter-acknowledgment time interval is the service time of a packet at a slowest node in the path between the sending station and the receiving station.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

Figure 3:
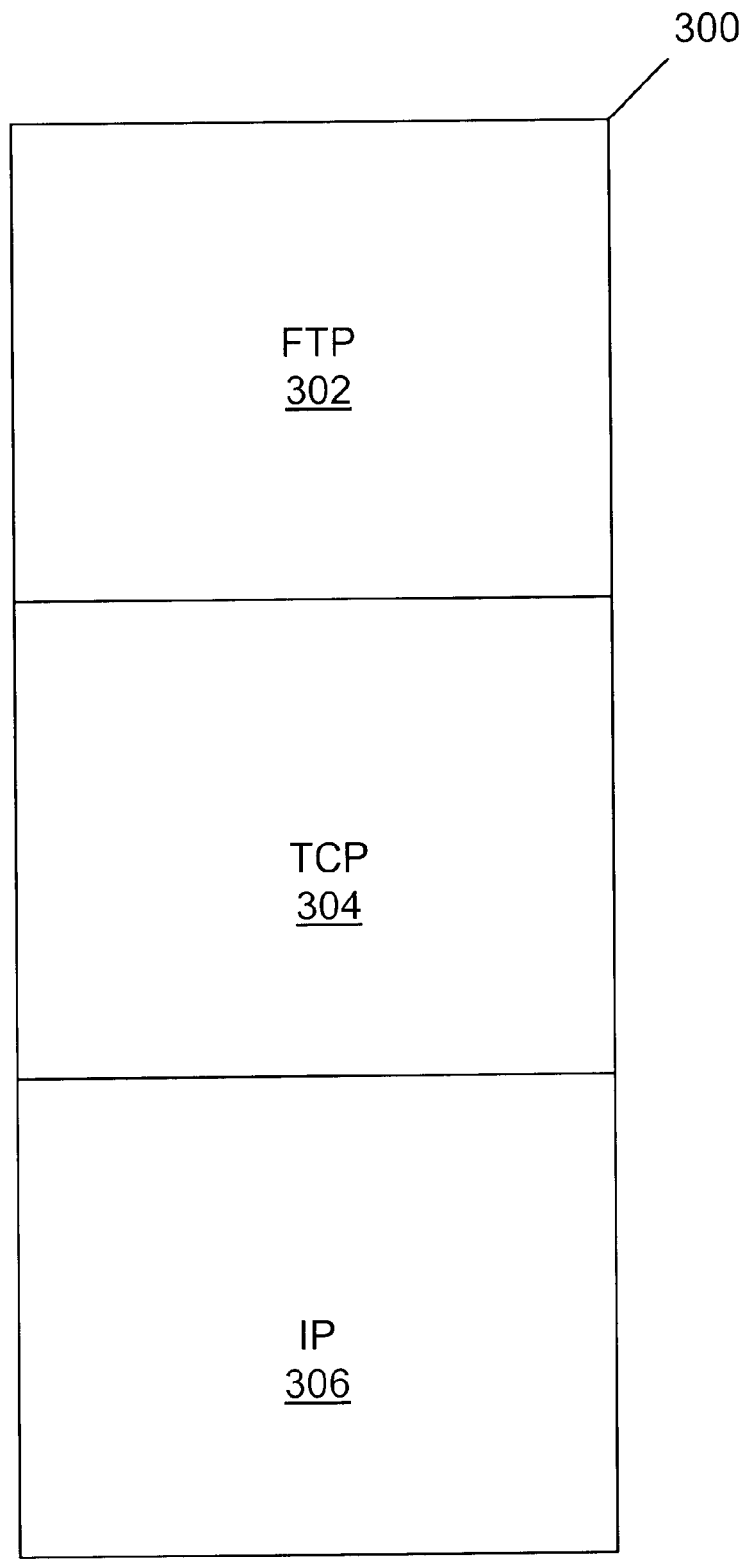
FIG. 3 is a diagram of a Transmission Control Protocol/Internet Protocol (TCP/IP) stack in accordance with a preferred embodiment of the present invention.

With reference now to FIG. 3, a diagram of a Transmission Control Protocol/Internet Protocol (TCP/IP) stack is depicted in accordance with a preferred embodiment of the present invention. The processes of the present invention may be implemented within TCP/IP stack 300. TCP/IP stack 300 is implemented as a set of instructions executed by a processor, such as processor 202 in FIG. 2. TCP/IP stack 300 includes a File Transfer Protocol (FTP) layer 302, a TCP layer 304, and an IP layer 306. FTP layer 302 provides the functions used to transfer files over a TCP/IP network, such as, for example, the Internet or a UNIX network. TCP layer 304 provides transport functions, which ensures that the total amount of bytes sent is received correctly at the other end. IP layer 306 implements the network of the protocol, which contains a network address and is used to route a message to a different network or subnetwork. In this example, TCP layer 304 contains the instructions used to implement the processes of the present invention. More specifically, TCP layer 304 contains the instructions or code necessary to select packet sizes, make measurements regarding the transfer of packets of different sizes, and to identify an optimal packet size based on the measurements.

When an optimal packet size is to be identified, TCP layer 304 selects a first packet size and transmits a set of packets to a receiving station, using the first packet size. The receiving station also is referred to as a target. Measurements regarding the transmission of the packets are made. Then, a second packet size is selected and a second set of packets is transmitted to the receiving station. Measurements regarding this transmission also are made. The measurements collected for the two sets of packets are used to identify an optimal packet size for transmission of data from the data processing system in which TCP layer 304 is located to the target. This optimal packet size is used by IP layer 306 to transfer data to the target with a maximum throughput rate. The packets are IP packets that may be repackaged or broken into smaller packets in the high-speed network through which the data flows. The packet size selected is one that maximizes the throughput rate of the flow of the data from the source to the target.

In this manner, the present invention provides a method and apparatus in which packet size may be used to optimize or maximize the data transfer rates for files in high-speed networks. This mechanism provides an alternative to the selection of windows in which data is to be sent and allows for faster transfer through the high-speed network by adjusting the size of the packet.

A packet size $\tilde{p}$ is associated with a file transfer throughput rate that is an increasing function for all network packet sizes less than $\tilde{p}$. For packet sizes greater than $\tilde{p}$, the file transfer throughput rate is a decreasing function. The file transfer throughput rate is a maximum when the network packet size equals $\tilde{p}$.

An explicit formula for the optimal IP network packet size is derived as described below. This packet size obtained from the formula is the size that maximizes the average file transfer throughput between the sending and receiving stations. The average file transfer throughput may be expressed as a function of (1) the TCP window size; (2) the average round trip time of a packet; (3) the network packet size; and (4) the average service time of a packet at the slowest processing node in the path between the sending and receiving stations.

In these examples, the TCP window size is in bytes. The average round trip time of a packet is the average elapsed time from the time a packet is transmitted from the sending station until the time an acknowledgment is received at the sending station. This measurement is made in seconds. This average round trip time includes the round trip time propagation delay, which is the time it takes a bit to travel along the wires at the speed of light. The network packet size is in bytes. The average service time of a packet at the slowest processing node is identified as the difference in inter-arrival times between any two successive acknowledgments. The average service time of a packet at the slowest processing node in the path between the sending and receiving stations also is a measure of the maximum network bandwidth. This measurement is made in seconds.

If $s_m$ denotes the service time of a network packet of size p at the bottleneck node, then the file transfer throughput $\Lambda$ must satisfy:

$$\Lambda \leq \frac{p}{s_m}. \quad [1]$$

The term on the right hand side of equation [1] is the maximum achievable network bandwidth. If W is the TCP window size and RTT is the average round trip time of a packet, the file transfer throughput also satisfies:

$$\Lambda = \frac{W}{RTT}. \quad [2]$$

A simple expression for the throughput rate that combines equations [1] and [2] is:

$$\Lambda = \min\left\{\frac{W}{RTT}, \frac{p}{s_m}\right\}. \quad [3]$$

The file transfer throughput formula above in equation [3] is further refined by expressing the average service time and the average round trip time at the bottleneck server of a packet as follows:

$$s_m(p)=ap+b. \quad [4]$$

$$RTT(p)=cp+d. \quad [5]$$

This refinement occurs because the cost to process a packet has a constant part that is independent of the packet size, and a linear part that is dependent on the packet size.

The expression in equation [3] of the file transfer throughput then becomes:

$$\Lambda(p) = \min\left\{\frac{W}{cp+d}, \frac{p}{ap+b}\right\}. \quad [6]$$

From this expression, implicit formulas for the average file transfer throughput are derived. For all p that satisfy:

$$cp^2+(d-aW)p-bW \leq 0, \quad [7]$$

then $\Lambda=p/(ap+b)$; otherwise $\Lambda=W/(cp+d)$. The feasible solution of the quadratic in equation [7] is:

$$\tilde{p} = \frac{(aW-d)+\sqrt{(aW-d)^2+4bcW}}{2c}. \quad [8]$$

For all $p \leq \tilde{p}$, the average file transfer throughput is:

$$\Lambda(p) = \frac{p}{ab+b}, \quad [9]$$

and for all $p > \tilde{p}$, $$\Lambda(p) = \frac{W}{cp+d}. \quad [10]$$

Note that for $p=\tilde{p}$, the throughput rate functions in equations [9] and [10] have the same value because $\tilde{p}$ is a root of the quadratic in equation [7]. Also, since the expression in equation [9] is an increasing function of p and the expression in equation [10] is a decreasing function of p, then the average file transfer throughput is a maximum when $p=\tilde{p}$. Hence, the optimal network packet size is given by equation [8].

The measurement of parameters used to identify the optimal network packet size from equation [8] are described below.

A mechanism is presented to identify the values for parameters of the average service time of the slowest processing node in the path between the sender and receiver for equation [4] and the average round trip time of a packet for equation [5]. The optimal network packet size given by equation [8] is a function of these parameters. The knowledge of these parameters and the transmission window size, W, enables calculation of the optimal network packet size. A predetermined number of packets, N, to be sent from the source to the target is selected. This number N is typically selected to be high enough to obtain accurate measurements. As a rule of thumb, N is chosen to be the integer part of the window size divided by the chosen network packet size. This number should be greater than 1. Two packet sizes are selected, $p_1$ and $p_2$. Packets are sent in a burst for each network packet size.

Figure 4:
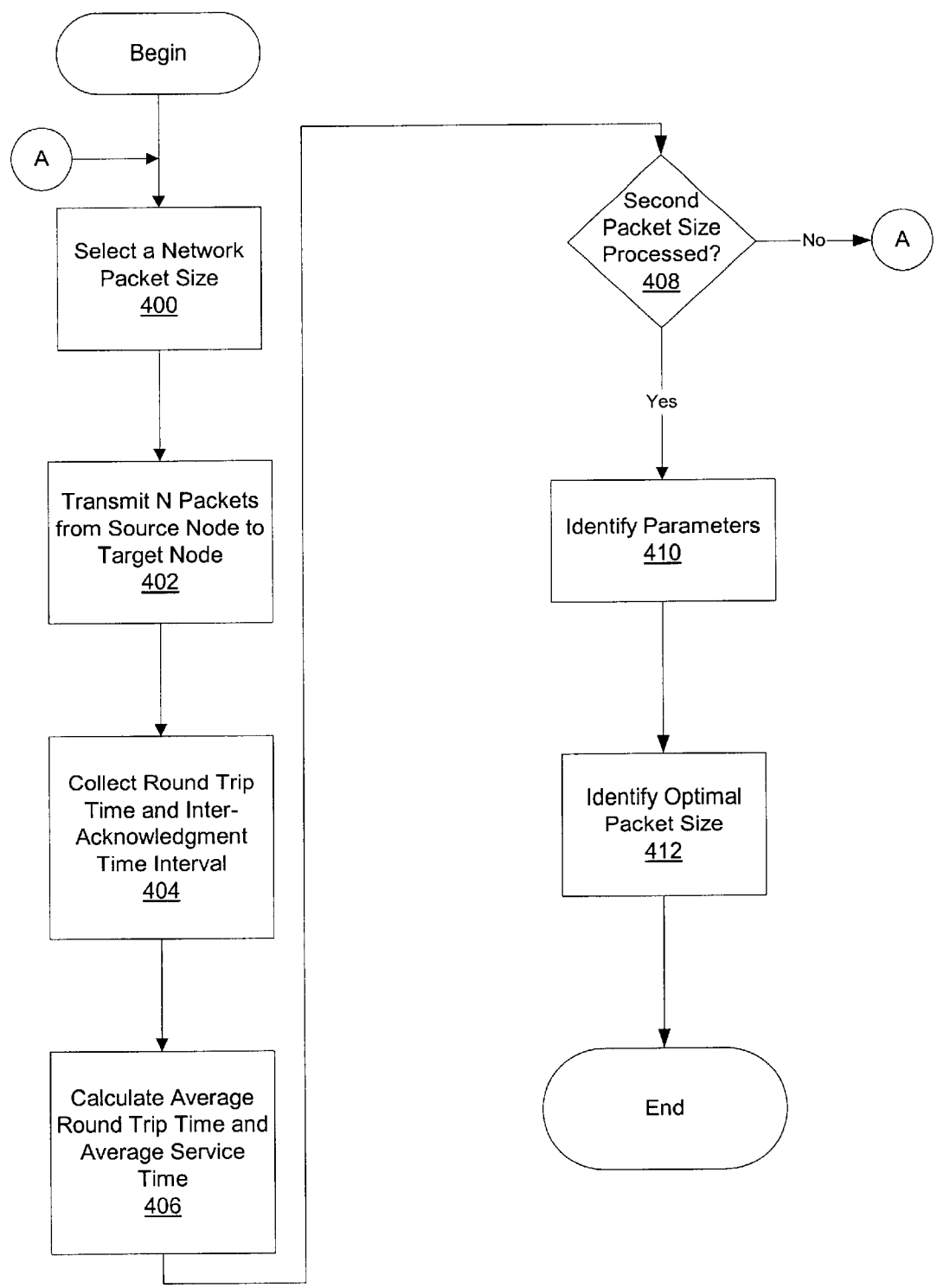
FIG. 4 is a flowchart of a process for identifying an optimal packet size in accordance with a preferred embodiment of the present invention.

With reference now to FIG. 4, a flowchart of a process for identifying an optimal packet size is depicted in accordance with a preferred embodiment of the present invention. The process for identifying an optimal packet size is implemented in the TCP layer, such as TCP layer 304 in FIG. 3 in the depicted examples. Of course, this process could be implemented in other locations in the data processing system. Typically, this process will be located in both the target and source for the data transfer. Alternatively, the process could be located in a node in the path between the source and the target. In such a case, the data transfer is optimized only for the portion of the path involving the node and the target or source.

The process in FIG. 4 may be initiated using a policy. The policy defines when the process is initiated. For example, the policy may cause initiation of this process for selecting an optimal packet size in response to an event, such as initiation of a communications link with a target. Additionally, the policy may initiate the process each time a data transfer is to occur between the target and the source. The event may be a periodic event, such as, for example, the expiration of a timer. In such a case, optimization may occur during the data transfer.

The process begins by selecting a network packet size (step 400). Typical values that may be used for the packet size are: zero bytes (just a header packet), 500 bytes, 1000 bytes, and 2000 bytes. However, other values will work as well. The first time step 400 occurs, the network packet size is fixed at $p_1$. Next, N packets are transmitted from the source to the target in a burst (step 402). A burst occurs when a packet is transmitted immediately after the transmission of the prior packet. For each of the N transmitted packets, the round trip time and the inter-acknowledgment time interval measurements are collected (step 404). The inter-acknowledgment time interval is the same as the service time of a packet at the bottleneck node. In measuring the round trip time, the time of departure of each packet is recorded. The time of arrival of each acknowledgment packet also is recorded. The difference between the arrival of the acknowledgment packet and the departure of its corresponding packet is the round trip time. The inter-acknowledgment time is identified by the differences between the arrival times of successive acknowledgment packets. The average round trip time and average service time at the slowest processing node are calculated by averaging over the N measurements, respectively (step 406). In step 406, $RTT(p_1)$ and $S(p_1)$ are obtained as the average round trip time and the average service time for the first packet size.

A determination is then made as to whether a second packet size has been selected and processed (step 408). If a second packet size has not been selected, the process returns to step 400 to fix the network packet size at $p_2$. Steps 402–406 are repeated to obtain the average round trip time, $RTT(p_2)$, and the average service time, $S(p_2)$, for the second packet size.

With reference again to step 408, when the second packet size has been processed, then parameters are identified (step 410). In step 410, the values of the parameters a, b, c, and d are identified as follows from equations [4] and [5]:

$$a = \frac{S(p_1) - S(p_2)}{p_1 - p_2}, \quad [11]$$

$$b = S(p_1) - ap_1, \quad [12]$$

$$c = \frac{RTT(p_1) - RTT(p_2)}{p_1 - p_2}, \quad [13]$$

$$d = RTT(p_1) - cp_1. \quad [14]$$

Thereafter, the optimal packet size is calculated (step 412) with the process terminating thereafter. The optimal packet size is calculated using the identified parameters in equation [8] as set forth above.

In the depicted examples, the window size, W, is selected by the TCP layer to be the largest buffer size of the source and target. A larger window size results in a larger throughput.

Thus, a mechanism is provided to identify a network packet size that maximizes the file transfer throughput rate sustained between a sender and a receiver. This network packet size is an optimal network packet size. This optimal network packet size is very useful in high-speed network transmission media where high file transfer throughput rates are desirable. The formula in the depicted examples depends on the transmission protocol window size and parameters that constitute the average round trip time and the service time at the slowest processing node in the path between the sending and receiving stations. The present invention also provides a mechanism to measure these parameters for use in calculating the optimal network packet size.

With an optimal network packet size and optimal transmission window size, high file transfer throughput rates are possible. Thus, with the alternative mechanism to identify a maximum throughput or transmission speed for data, the present invention allows for maximizing the speed in which data is transferred using an optimal packet size in addition to an optimal transmission window size. The right setting of these two parameters is useful in network environments, while high file transfer throughput rates are needed in these environments.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, a CD-ROM, a DVD-ROM, and transmission-type media such as digital and analog communications links, wired or wireless communications links using transmission forms such as, for example, radio frequency and light wave transmissions. The computer readable media may take the form coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, although the present invention is illustrated in the context of a TCP/IP system in which an ATM high-speed network is used, the present invention may be applied to other types of networks, such as, for example, such as, for example, IP over SONET. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for identifying an optimal packet size for transferring data to a target, the method comprising:

selecting a first packet size;

sending a first set of packets to the target using the first packet size;

measuring round trip times and service times for the first set of packets;

selecting a second packet size;

sending a second set of packets to the target using the second packet size;

measuring round trip times and service times for the second set of packets; and identifying the optimal packet size based on the round trip times and service times for the first set of packets and the round trip times and service times for the second set of packets.

2. The method of claim 1, wherein the optimal packet size is identified based on a policy.

3. The method of claim 2, wherein the policy is to identify the optimal packet size based on a selected event.

4. The method of claim 3, wherein the selected event is a periodic event.

5. The method of claim 3, wherein the selected event is an initiation of a data transfer to the target.

6. The method of claim 1 further comprising:

sending the data to the target using the optimal packet size.

7. The method of claim 1, wherein the service times for the first set of packets and the service times for the second set of packets are measured for a slowest processing node in a path between the data processing system and the target.

8. The method of claim 1 further comprising:

determining an average round trip time and an average service time for the first packet size and an average round trip time and an average service time for the second packet size using the round trip times and the service times for the set of transferred packets and wherein the selecting step comprises selecting the optimal packet size as:

$$\tilde{p} = \frac{(aW - d) + \sqrt{(aW - d)^2 + 4bcW}}{2c}$$

wherein $\tilde{p}$ is the optimal packet size, $$a = \frac{S(p_1) - S(p_2)}{p_1 - p_2},$$

$b = S(p_1) - ap_1$, $$c = \frac{RTT(p_1) - RTT(p_2)}{p_1 - p_2},$$

$d = RTT(p_1) - cp_1$, $p_1$ is the first packet size, $p_2$ is the second packet size, $RTTP(p_1)$ is the average round trip time for the first packet size, $RTTP(p_2)$ is the average round trip time for the second packet size, $S(p_1)$ is the average service time for the first packet size, $S(p_2)$ is the average service time for the second packet size.

9. A data processing system for identifying an optimal packet size for transferring data to a target, the data processing system comprising:

first selecting means for selecting a first packet size;

first sending means for sending a first set of packets to the target using the first packet size;

first measuring means for measuring round trip times and service times for the first set of packets;

second selecting means for selecting a second packet size;

second sending for sending a second set of packets to the target using the second packet size;

second measuring means for measuring round trip times and service times for the second set of packets; and identifying means for identifying the optimal packet size based on the round trip times and service times for the first set of packets and the round trip times and service times for the second set of packets.

10. The data processing system of claim 9, wherein the optimal packet size is identified based on a policy.

11. The data processing system of claim 10, wherein the policy is to identify the optimal packet size based on a selected event.

12. The data processing system of claim 11, wherein the selected event is a periodic event.

13. The data processing system of claim 11, wherein the selected event is an initiation of a data transfer to the target.

14. The data processing system of claim 9 further comprising:

third sending means for sending the data to the target using the optimal packet size.

15. The data processing system of claim 9, wherein the service times for the first set of packets and the service times for the second set of packets are measured for a slowest processing node in a path between the data processing system and the target.

16. The data processing system of claim 9 further comprising:

determining means for determining an average round trip time and an average service time for the first packet size and an average round trip time and an average service time for the second packet size using the round trip times and the service times for the set of transferred packets and wherein the selecting step comprises selecting the optimal packet size as:

$$\tilde{p} = \frac{(aW - d) + \sqrt{(aW - d)^2 + 4bcW}}{2c}$$

wherein $\tilde{p}$ is the optimal packet size, $$a = \frac{S(p_1) - S(p_2)}{p_1 - p_2},$$

$b = S(p_1) - ap_1$, $$c = \frac{RTT(p_1) - RTT(p_2)}{p_1 - p_2},$$

$d = RTT(p_1) - cp_1$, $p_1$ is the first packet size, $p_2$ is the second packet size, $RTTP(p_1)$ is the average round trip time for the first packet size, $RTTP(p_2)$ is the average round trip time for the second packet size, $S(p_1)$ is the average service time for the first packet size, $S(p_2)$ is the average service time for the second packet size.

17. A data processing system comprising:

a communications interface configured for connection to a network, wherein the communications interface is configured to send and receive packets; and a processing unit, wherein the processing unit executes instructions to select a first packet size and a second packet size, sends a set of packets using the first packet size and the second packet size to a target data processing system to form a set of transferred packets, identifies round trip times and service times for the set of transferred packets, and selects an optimal packet size using the round trip times and service times for the set of packets.

18. The data processing system of claim 17, wherein the set of packets are sent using an Internet Protocol.

19. The data processing system of claim 18, wherein the instructions are part of an Internet Protocol layer used to send the packets to the target data processing system.

20. The data processing system of claim 17, wherein the data processing system selects the optimal packet size as:

$$\tilde{p} = \frac{(aW-d) + \sqrt{(aW-d)^2 + 4bcW}}{2c}$$

wherein $\tilde{p}$ is the optimal packet size, $$a = \frac{S(p_1) - S(p_2)}{p_1 - p_2},$$

b=S($p_1$)–a$p_1$, $$c = \frac{RTT(p_1) - RTT(p_2)}{p_1 - p_2},$$

d=RTT($p_1$)–c$p_1$, $p_1$ is the first packet size, $p_2$ is the second packet size, RTTP($p_1$) is the average round trip time for the first packet size determined from the round trip times for the set of transferred packets having the first packet size, RTTP($p_2$) is the average round trip time for the second packet size determined from the round trip times for the set of transferred packets having the second packet size, S($p_1$) is the average service time for the first packet size determined from the service times for the set of transferred packets having the first packet size, and S($p_2$) is the average service time for the second packet size determined from the service times for the set of transferred packets having the second packet size.

21. The data processing system of claim 17, wherein the service times are identified for a slowest processing node in a path between the data processing system and the target.

22. A method in a data processing system for maximizing a transfer of data to a target, the method comprising the data processing system implemented steps of:

sending a set of packets using a first packet size and a second packet size to the target to form a set of transferred packets;

identifying round trip times and service times for the set of transferred packets; and selecting an optimal packet size using the round trip times and the service times for the set of packets, wherein the optimal packet size is used in transferring the data to the target.

23. The method of claim 22, wherein the selecting, sending, and identifying steps are based on a policy.

24. The method of claim 23, wherein the policy is to identify the optimal packet size based on a selected event.

25. The method of claim 24, wherein the selected event is a periodic event.

26. The method of claim 24, wherein the selected event is an initiation of a data transfer to the target.

27. The method of claim 22 further comprising:

determining an average round trip time and an average service time for the first packet size using the round trip times and the service times for the set of transferred packets;

determining an average round trip time and an average service time for the second packet size using the round trip times and the service times for the set of transferred packets and wherein the selecting step comprises selecting the optimal packet size as:

$$\tilde{p} = \frac{(aW-d) + \sqrt{(aW-d)^2 + 4bcW}}{2c}$$

wherein $\tilde{p}$ is the optimal packet size, $$a = \frac{S(p_1) - S(p_2)}{p_1 - p_2},$$

b=S($p_1$)–a$p_1$, $$c = \frac{RTT(p_1) - RTT(p_2)}{p_1 - p_2},$$

d=RTT($p_1$)–c$p_1$, $p_1$ is the first packet size, $p_2$ is the second packet size, RTTP($p_1$) is the average round trip time for the first packet size, RTTP($p_2$) is the average round trip time for the second packet size, S($p_1$) is the average service time for the first packet size, S($p_2$) is the average service time for the second packet size.

28. The method of claim 22, wherein the service times are identified for a slowest processing node in a path between the data processing system and the target.

29. The method of claim 22, wherein the sending, identifying, and selecting steps are performed in an Internet Protocol layer in the data processing system.

30. The method of claim 22, wherein the data is sent in packets over a high-speed network.

31. The method of claim 22, wherein the high-speed network is a asynchronous mode transfer network.

32. A distributed data processing system comprising:

a network;

a first data processing system; and a second data processing system, wherein the second data processing system selects a first packet size and a second packet size, sends a set of packets using the first packet size and the second packet size to the first data processing system to form a set of transferred packets, identifies round trip times and service times for the set of transferred packets, and selects an optimal packet size using the round trip times and the service times for the set of packets.

33. The distributed data processing system of claim 32, wherein the second data processing system sends data to the first data processing system using the optimal packet size.

34. The distributed data processing system of claim 32, wherein the network includes an asynchronous transfer mode network.

35. The distributed data processing system of claim 32, wherein the optimal packet size is an optimal packet size for Internet Protocol packets.

36. The distributed data processing system of claim 32, wherein the second data processing system selects the optimal packet size as:

$$\tilde{p} = \frac{(aW-d) + \sqrt{(aW-d)^2 + 4bcW}}{2c}$$

wherein $\tilde{p}$ is the optimal packet size, $$a = \frac{S(p_1) - S(p_2)}{p_1 - p_2},$$

$b = S(p_1) - ap_1,$ $$c = \frac{RTT(p_1) - RTT(p_2)}{p_1 - p_2},$$

$d = RTT(p_1) - cp_1$, $p_1$ is the first packet size, $p_2$ is the second packet size, $RTTP(p_1)$ is the average round trip time for the first packet size determined from the round trip times for the set of transferred packets having the first packet size, RTTP $(p_2)$ is the average round trip time for the second packet size determined from the round trip times for the set of transferred packets having the second packet size, $S(p_1)$ is the average service time for the first packet size determined from the service times for the set of transferred packets having the first packet size, and $S(p_2)$ is the average service time for the second packet size determined from the service times for the set of transferred packets having the second packet size.

37. The distributed data processing system of claim 32, wherein the service times are identified for a slowest processing node in a path between the first data processing system and the second data processing system.

38. A computer program product in a computer readable medium for maximizing a transfer of data to a target, the computer program product comprising:
first instructions for sending a set of packets using a first packet size and a second packet size to the target to form a set of transferred packets;
second instructions for identifying round trip times and service times for the set of transferred packets; and
third instructions for selecting an optimal packet size using the round trip times and the service times for the set of packets, wherein the optimal packet size is used in transferring the data to the target.

39. A computer program product in a computer readable medium for identifying an optimal packet size for transferring data to a target, the computer program product comprising:
first instructions for selecting a first packet size;
second instructions for sending a first set of packets to the target using the first packet size;
third instructions for measuring round trip times and service times for the first set of packets;
fourth instructions for selecting a second packet size;
fifth instructions for sending a second set of packets to the target using the second packet size;
sixth instructions for measuring round trip times and service times for the second set of packets; and
seventh instructions for identifying the optimal packet size based on the round trip times and service times for the first set of packets and the round trip times and service times for the second set of packets.

40. A data processing system for maximizing a transfer of data to a target, the data processing system comprising:
sending means for sending a set of packets using a first packet size and a second packet size to the target to form a set of transferred packets;
identifying means for identifying round trip times and service times for the set of transferred packets; and
selecting means for selecting an optimal packet size using the round trip times and the service times for the set of packets, wherein the optimal packet size is used in transferring the data to the target.

41. The data processing system of claim 40, wherein the selecting, sending, and identifying means are initiated by a policy.

42. The data processing system of claim 41, wherein the policy is to identify the optimal packet size based on a selected event.

43. The data processing system of claim 42, wherein the selected event is a periodic event.

44. The data processing system of claim 42, wherein the selected event is an initiation of a data transfer to the target.

45. The data processing system of claim 40 further comprising:
determining means for determining an average round trip time and an average service time for the first packet size and an average round trip time and an average service time for the second packet size using the round trip times and the service times for the set of transferred packets and wherein the selecting step comprises selecting the optimal packet size as:

$$\tilde{p} = \frac{(aW - d) + \sqrt{(aW - d)^2 + 4bcW}}{2c}$$

wherein $\tilde{p}$ is the optimal packet size, $$a = \frac{S(p_1) - S(p_2)}{p_1 - p_2},$$

$b = S(p_1) - ap_1,$ $$c = \frac{RTT(p_1) - RTT(p_2)}{p_1 - p_2},$$

$d = RTT(p_1) - cp_1$, $p_1$ is the first packet size, $p_2$ is the second packet size, $RTTP(p_1)$ is the average round trip time for the first packet size, $RTTP(p_2)$ is the average round trip time for the second packet size, $S(p_1)$ is the average service time for the first packet size, $S(p_2)$ is the average service time for the second packet size.

46. The data processing system of claims 40, wherein the service times are identified for a slowest processing node in a path between the data processing system and the target.

47. The data processing system of claim 40, wherein the sending, identifying, and selecting means are located in an Internet Protocol layer in the data processing system.

48. The data processing system of claim 40, wherein the data is sent in packets over a high-speed network.

49. The data processing system of claim 40, wherein the high-speed network is an asynchronous mode transfer network.

* * * * *